July 31, 1951 — J. F. SHIRK — 2,562,512
PISTON RING
Filed Dec. 26, 1947
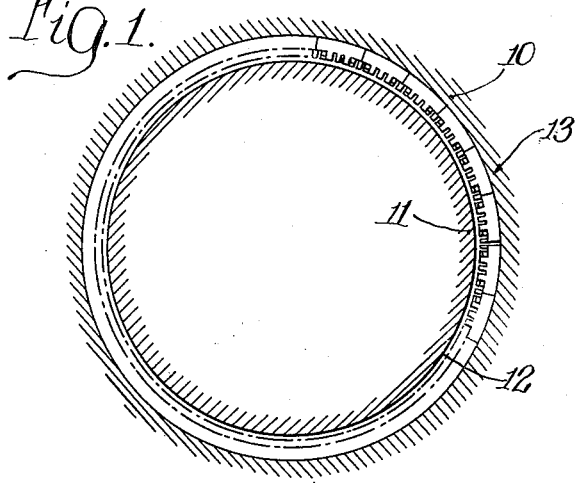
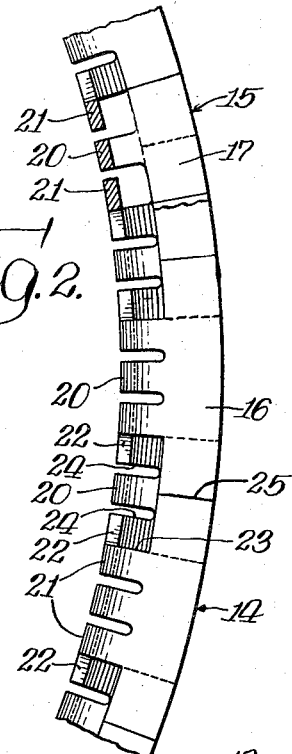
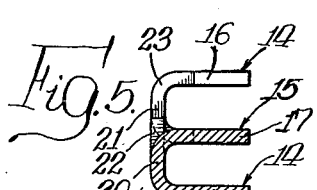
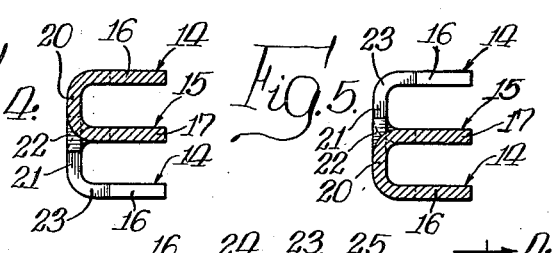
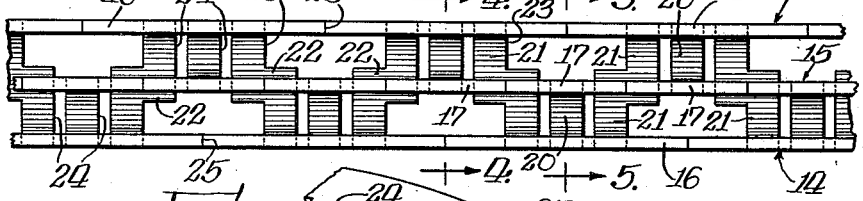
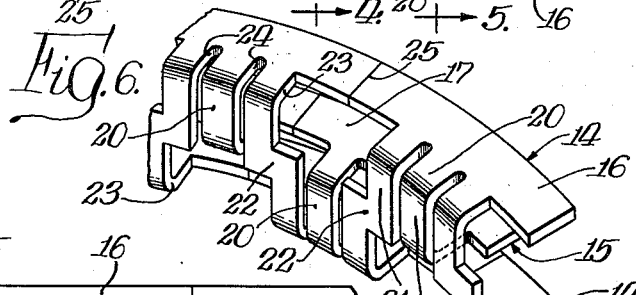
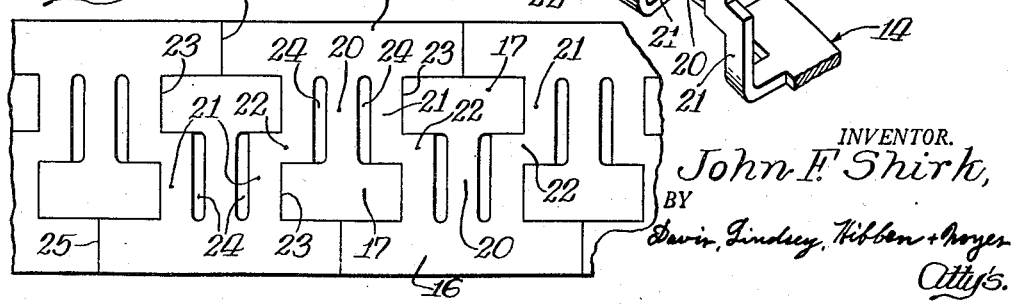
INVENTOR.
John F. Shirk,
BY
Davis, Lindsey, Hibben & Noyes
Att'ys.

Patented July 31, 1951

2,562,512

UNITED STATES PATENT OFFICE 2,562,512

PISTON RING

John F. Shirk, Hagerstown, Ind., assignor to Perfect Circle Corporation, Hagerstown, Ind., a corporation of Indiana Application December 26, 1947, Serial No. 793,791

19 Claims. (Cl. 309—45)

The invention relates generally to piston rings and more particularly to a piston ring of sheet metal construction.

The general object of the invention is to provide a novel sheet metal piston ring construction for use in an internal combustion engine or the like and adapted to provide effective oil control in the cylinder.

Another object is to provide a novel sheet metal piston ring having a cylinder contacting edge or flange for scraping oil from the cylinder wall, with the ring vented inwardly on both sides of such flange so that oil removed by the flange is free to flow inwardly and be returned to the crankcase of the engine through the piston.

A further and more specific object is to provide a piston ring of sheet metal construction comprising three axially spaced rails or flanges of segmental construction for circumferential extensibility, with the segments of each outer rail flexibly connected to the segments of the other outer rail and to the segments of the intermediate rail.

Other objects and advantages will become apparent from the following description taken in connection with the accompanying drawings, in which:

Figure 1 is a transverse sectional view of a piston and a portion of the cylinder in which the piston operates, the piston having a piston ring embodying the features of the invention.

Fig. 2 is an enlarged fragmentary plan view of the piston ring shown in Fig. 1.

Fig. 3 is a fragmentary view of the outer periphery of the ring.

Fig. 4 is a radial sectional view taken on the line 4—4 of Fig. 3.

Fig. 5 is a radial sectional view taken on the line 5—5 of Fig. 3.

Fig. 6 is a fragmentary perspective view of the ring looking at the inner periphery thereof.

Fig. 7 is a view of the blank from which the ring is made.

A ring embodying the features of the invention is preferably of sheet metal construction shaped to provide a cylinder-engaging flange or rail intermediate the sides of the ring, with the ring so constructed that oil collecting on either side of the rail may flow inwardly through the ring for return through the ring-receiving groove and piston to the crankcase. The ring may have, and preferably does have, in addition to the intermediate rail, a pair of outer cylinder-engaging rails located at the sides of the ring, so that the ring presents three cylinder-contacting edges for removing excess oil from the wall surface of the cylinder during reciprocation of the piston. All of the rails are here shown as being of segmental construction, with the segments of the respective rails interconnected in such a manner as to provide for circumferential expansion of the ring. Generally described, the ring may be said to be E-shaped in radial cross section with each of the three horizontal bars of the E comprising a single layer of metal. The web members are circumferentially spaced from one another and are so formed as to provide relatively large openings at the inner periphery of the ring so that oil collected on either side of the intermediate or center rail may flow freely through the ring inwardly to the ring-receiving groove in the piston. The ring may be formed from a strip of sheet metal having a length substantially equal to the circumference of the ring, the strip being punched and sheared as illustrated in Fig. 7 and then bent to provide the ultimate form.

In Fig. 1, there is shown a fragmentary portion of a cylinder 10 with a piston 11 mounted therein. Formed in the periphery of the piston 11 is a ring groove 12 in which a ring, indicated generally at 13, is mounted, the ring 13 being more fully illustrated in the higher-numbered figures. The ring 13 in the embodiment shown in the drawings comprises three axially spaced rails, the two outer rails being indicated generally at 14 and the intermediate rail being indicated generally at 15. All three rails are preferably of segmental construction. Thus, each of the outer rails comprises a plurality of segments 16 while the intermediate rail 15 comprises a plurality of segments 17. The segments in the respective rails are circumferentially aligned so that each rail comprises a single thickness or layer of metal.

The segments of the respective rails constitute only a portion of the radial width of the ring and are connected by a web structure formed to permit the ring to expand circumferentially. In the form shown in the drawings, each of the segments 17 forming the intermediate rail is connected to one of the segments in one of the outer rails, adjoining segments 17 being connected to segments in opposite outer rails to provide a staggered relation. Thus, as is most clearly apparent in Figs. 3 and 6, each segment 17 is provided with a web member 20 extending first inwardly from the segments 17, then axially, and then outwardly to connect with a segment 16 in one of the outer rails. The web members 20 are formed integrally with the segments 16 and 17 and, as is apparent from these two figures of the drawing, one segment 17 is connected to a segment in one of the outer rails, while the next segment 17 is connected to a segment in the other outer rail. The axially extending portions of the web members 20 are straight and have no circumferential offset.

The segments 16 in one outer rail are also connected to two segments in the opposite outer rail, thus providing the circumferential connection between the segments. For this purpose, I provide web members 21. Each web member 21 is integral with the segments which it connects and extends inwardly from one of the segments 16 in one outer rail, then axially, and then outwardly to another segment 16 in the other outer rail. In the axially extending portion of each segment 21, there is an offset, indicated at 22, for purposes hereinafter described. The separations or slits between the segments 16 in each of the outer rails are out of axial alignment with the separations between the adjacent segments in the other outer rail, and the separations between the segments 17 in the intermediate rail are out of axial alignment with the separations between the segments in both of the outer rails. With this arrangement, when the ring expands slightly so that such separations have some width, oil on the cylinder wall passing through the separations in one rail will be caught by the segments in the other two rails.

With the foregoing arrangement of the web members 20 and 21, there are twice as many segments in the intermediate rail as there are in either of the outer two rails, since each segment 17 in the intermediate rail is connected to only one segment 16 in the outer rails and there is one segment 17 for each of the segments 16. The foregoing construction of the web members 20 and 21 also results in each outer segment 16 having three web members extending therefrom, two of them being web members 21 and the third being a web member 20. The two web members 21 are spaced from one another so that the web member 20 lies therebetween, and the offsets 22 in the two web members for each segment extend in opposite directions to form enlarged openings, indicated at 23, in the inner portion of the ring, the openings 23 being in staggered relation to one another. Between the two web members 21 and the web member 20 are narrow openings or slots 24.

The ring may be formed from a strip of sheet metal punched and sheared in the manner illustrated in Fig. 7. Such punching of the strip includes punching the slots 24 so that they extend transversely of the strip in pairs and lie intermediate the outer edges thereof. From one end of each pair of slots 24 the metal is sheared in generally rectangular form to provide the openings 23. The metal from such shearing forms tongues comprising the segments 17 of the intermediate rail and is left connected to the portions of the metal lying between the slots 24, such portions thereby constituting the web members 20. The metal is also sheared as at 25 along lines extending from the rectangular shears to the outer edges of the strip, thus forming the segments 16 and providing the separations or slits between the segments.

The strip is then bent along longitudinal lines, the segments 17 formed by the generally rectangular shears being bent, as indicated in Fig. 6, to extend outwardly intermediate the sides of the ring to form the intermediate rail 15. The strip as a whole is also bent into a generally channel-shaped form so that the segments 16 formed by the shears 25 form the two outer rails 14 with the edges of the strip being positioned at the outer periphery of the ring. The ring is then given its arcuate form and the necessary grinding on the outer periphery and sides of the ring is performed. Such bending of the ring results in providing a cross-sectional form which may be said to be generally E-shaped. Each of the rails comprises a single layer of metal with all three rails, which constitute the horizontal bars of the E, being of equal radial dimension. The offset 20 in the web members 21 provides sufficient circumferential length for the segments 17 to constitute a complete rail interrupted by separations between the segments of substantially the same width as the separations or slits between the segments 16. The large openings 23 as well as the slots 24 provide for free flow of oil inwardly through the ring from both sides of the intermediate rail 15. Thus, for either direction of movement during the reciprocation of the piston, the oil scraped from the piston wall by the intermediate rail 15 as well as by the outer rails 14 may freely drain back through the ring into the groove 12 in the piston, from which it is discharged into the crankcase by the usual drain holes provided in the piston.

I claim:

1. A piston ring of sheet metal construction comprising a web portion having three cylinder-engaging rails bent outwardly therefrom and axially spaced from one another.

2. A piston ring formed from a single strip of sheet metal folded longitudinally of itself to form integrally connected portions providing three outwardly extending rails adapted to engage the cylinder edgewise, the rails being axially spaced from one another.

3. A piston ring comprising a strip of sheet metal bent to provide three rails axially spaced from one another with each rail having slits dividing the rail into a plurality of cylinder-engaging segments integrally connected to segments in the other rails, the upper and lower faces of each segment being provided by the two faces of the strip.

4. A piston ring comprising three rails axially spaced from one another with each rail comprising a plurality of cylinder-engaging segments, and web members integrally connecting the segments in each rail to segments in the other rails, the web members being spaced from the ends of the segments to circumferentially separate the web members from each other.

5. A piston ring comprising a strip of sheet metal folded longitudinally of itself to provide three rails axially spaced from one another with each rail comprising a plurality of cylinder-engaging segments, and web members connecting the segments in each rail with segments in the other two rails, the intermediate rail having twice as many segments as each of the other two rails.

6. A piston ring comprising three rails axially spaced from one another with each rail comprising a plurality of segments, each segment of the outer two rails having a segment of the intermediate rail connected thereto with each segment of the intermediate rail connected to only one segment in an outer rail.

7. A piston ring comprising three rails axially spaced from one another with each rail comprising a plurality of segments, each segment in each outer rail having connections to two segments in the opposite outer rail, the segments in the intermediate rail having connections to the segments in the outer rails other than the first-mentioned connections.

8. A piston ring comprising three rails axially spaced from one another with each rail comprising a plurality of segments, each segment in each outer rail having two connections respectively to two segments in the opposite outer rail and a third connection to only one segment in the intermediate rail.

9. A piston ring comprising three rails axially spaced from one another with each rail comprising a plurality of segments, the segments in the intermediate rail being alternately connected to segments in the respective outer rails.

10. A piston ring comprising three rails axially spaced from one another and connected solely at their inner peripheries, each rail having a plurality of radial slits dividing the rail into segments, the slits in the respective rails being circumferentially offset from one another to position all slits out of axial alignment with each other.

11. A piston ring of sheet metal construction comprising three axially spaced rails, each comprising a plurality of segments, web members connecting the segments of one outer rail with those of the other outer rail, and other web members shorter than the first-mentioned web members and connecting the segments of the intermediate rail with the segments of the two outer rails.

12. A piston ring of sheet metal construction comprising three axially spaced rails, each comprising a plurality of segments, web members connecting the segments of the intermediate rail with the segments of the other two rails, and other web members connecting the segments of each outer rail with those of the other outer rail, said last-mentioned web members having circumferentially offset portions.

13. A piston ring of sheet metal construction comprising three axially spaced rails, each comprising a plurality of segments, one set of web members connecting the segments of the intermediate rail with the segments of the two outer rails and including axially extending portions, and a second set of web members connecting the segments of each outer rail with those of the other outer rail and including axially extending portions, said portions of the first set of web members being straight and said portions of the second set of web members having circumferential offsets.

14. A piston ring of sheet metal construction comprising three axially spaced rails, each comprising a plurality of segments, web members connecting the segments of the intermediate rail with the segments of the other two rails, and a pair of other web members connecting each segment of each outer rail with segments of the other outer rail, the web members of each of said pairs being circumferentially offset in opposite directions.

15. A piston ring of sheet metal construction comprising three axially spaced rails, each comprising a plurality of segments, each segment of each outer rail having three web members extending therefrom, two of said web members being connected to segments in the other outer rail, and the third web member being connected to a segment in the intermediate rail.

16. A piston ring of sheet metal construction comprising three axially spaced rails, each comprising a plurality of segments, each segment of each outer rail having two circumferentially spaced web members connected to segments in the other outer rail and a third web member positioned between said two web members and connected to a segment in the intermediate rail.

17. A piston ring comprising a strip of sheet metal having transversely sheared edges with the strip bent along longitudinal lines and arcuately to form a ring having a pair of spaced rails connected by a web portion, the rails comprising a plurality of segments formed by the transverse shears, said strip having intermedite portions sheared and bent therefrom to provide a segmental rail positioned between and axially spaced from said pair of rails.

18. A piston ring comprising a strip of sheet metal bent along longitudinal lines and arcuately formed to provide a ring of generally channel shape cross section having a pair of outwardly extending rails with both edges of the strip at the outer periphery of the ring, said strip having portions intermediate its edges sheared and bent therefrom to provide a segmental rail positioned between and axially spaced from said pair of rails.

19. A piston ring comprising a strip of sheet metal bent into a generally channel shape in radial cross section providing a pair of cylinder-engaging rails, the ring having a plurality of tongues punched from the intermediate portion of the strip and bent outwardly between said rails to provide a third cylinder-engaging rail of segmental construction axially spaced from both rails of said pair.

JOHN F. SHIRK.

REFERENCES CITED

The following references are of record in the file of this patent:

UNITED STATES PATENTS

| Number | Name | Date |
| --- | --- | --- |
| 2,224,338 | Bowers | Dec. 10, 1940 |
| 2,259,548 | Bowers | Oct. 21, 1941 |
| 2,267,369 | Bowers | Dec. 23, 1941 |
| 2,325,196 | Rothweiler | July 27, 1943 |